(12) United States Patent
Koo et al.

(10) Patent No.: US 8,792,584 B2
(45) Date of Patent: Jul. 29, 2014

(54) METHOD FOR TRANSMITTING SOUNDING REFERENCE SIGNAL SEQUENCE USING PLURAL ANTENNAS

(75) Inventors: Ja Ho Koo, Seoul (KR); Seung Hee Han, Sungnam-si (KR); Moon Il Lee, Seoul (KR); Hyun Soo Ko, Anyang-si (KR); Jae Hoon Chung, Anyang-si (KR); Bin Chul Ihm, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 323 days.

(21) Appl. No.: 13/124,389

(22) PCT Filed: Sep. 24, 2009

(86) PCT No.: PCT/KR2009/005449
§ 371 (c)(1),
(2), (4) Date: Apr. 14, 2011

(87) PCT Pub. No.: WO2010/044555
PCT Pub. Date: Apr. 22, 2010

(65) Prior Publication Data
US 2011/0200143 A1  Aug. 18, 2011

Related U.S. Application Data

(60) Provisional application No. 61/119,384, filed on Dec. 3, 2008, provisional application No. 61/105,784, filed on Oct. 15, 2008.

(30) Foreign Application Priority Data

Mar. 24, 2009 (KR) .......................... 10-2009-0024821

(51) Int. Cl.
*H04L 27/00* (2006.01)
(52) U.S. Cl.
USPC .......................................................... 375/299
(58) Field of Classification Search
USPC .................................................. 375/229, 260
See application file for complete search history.

(56) References Cited

U.S. PATENT DOCUMENTS

| 2004/0166805 | A1  | 8/2004 | Kim et al. |
| 2007/0171995 | A1* | 7/2007 | Muharemovic et al. ...... 375/260 |

(Continued)

FOREIGN PATENT DOCUMENTS

| KR | 10-2008-0036055 | 4/2008 |
| WO | 2007/117127 | 10/2007 |
| WO | 2009/152696 | 12/2009 |

OTHER PUBLICATIONS

Samsung, "Correction on SRS hopping for closed loop antenna selection," R1-082316, 3GPP TSG RAN WG1 Meeting #53bis, Jun. 2008.

(Continued)

*Primary Examiner* — Jaison Joseph
(74) *Attorney, Agent, or Firm* — Lee, Hong, Degerman, Kang & Waimey

(57) ABSTRACT

Disclosed is a method for transmitting a sounding reference signal from a mobile terminal that includes plural antennas. Different plural sounding reference signal sequences that have mutual orthogonality are mapped to each antenna, and then transmitted. Or, the same sounding reference signal sequence is mapped to the plural antennas after precoding or cyclic delay diversity processing, and then transmitted.

10 Claims, 9 Drawing Sheets

(56) References Cited

U.S. PATENT DOCUMENTS

| | | | |
|---|---|---|---|
| 2008/0051125 A1* | 2/2008 | Muharemovic et al. | 455/519 |
| 2008/0232325 A1 | 9/2008 | Mehta et al. | |
| 2009/0046645 A1* | 2/2009 | Bertrand et al. | 370/329 |
| 2009/0238241 A1* | 9/2009 | Hooli et al. | 375/133 |
| 2009/0278742 A1* | 11/2009 | Mehta et al. | 342/374 |
| 2009/0303978 A1* | 12/2009 | Pajukoski et al. | 370/345 |
| 2009/0316756 A1* | 12/2009 | Ro et al. | 375/133 |
| 2010/0080187 A1* | 4/2010 | Papasakellariou et al. | 370/329 |
| 2010/0285762 A1* | 11/2010 | Ko et al. | 455/127.1 |

OTHER PUBLICATIONS

3rd Generation Partnership Project (3GPP), "Technical Specification Group Radio Access Network; Evolved Universal Terrestrial Radio Access (E-UTRA); Physical Channels and Modulation (Release 8)," 3GPP TS 36.211 V8.4.0, Sep. 2008, 78 pages.

Dahman, et al., "A method for identifying simultaneously-transmitted signals from different transmit antennas in multi-antenna channel sounding experiments," IEEE, 2008, 3 pages.

Korean Intellectual Property Office Application Serial No. 10-2009-0024821, Notice of Allowance dated Jul. 24, 2013, 2 pages.

The State Intellectual Property Office of the People's Republic of China Application Serial No. 200980149308.X Office Action dated Jan. 24, 2014, 7 pages.

Ericsson, "Sounding RS", R1-073729,TSG-RAN WG1 #50, Aug. 2007, 4 pages.

Texas Instruments, "Sounding Reference Signal Assignments in E-UTRA Uplink", R1-072849, 3GPP TSG RAN WG1 #49bis, 7 pages, Jun. 2007.

Huawei, "Multiplexing of E-UTRA Uplink Sounding Reference Signals", R1-072095, 3GPP TSG RAN WG1 Meeting #49, May 2007, 3 pages.

Samsung, "Summary of Offline Discussions on EUTRA UL RS", R1-08xxxx (R1-081662), 3GPP TSG RAN WG1 #52bis, Apr. 2008, 4 pages.

Texas Instruments, "Overview of Distributed ("Sounding") Reference Signal Multiplexing Methods in EUTRA Uplink", R1-063229, Nov. 2006, 10 pages.

\* cited by examiner

METHOD FOR TRANSMITTING SOUNDING REFERENCE SIGNAL SEQUENCE USING PLURAL ANTENNAS

CROSS-REFERENCE TO RELATED APPLICATIONS

This application is the National Stage filing under 35 U.S.C. 371 of International Application No. PCT/KR2009/005449, filed on Sep. 24, 2009, which claims the benefit of earlier filing date and right of priority to Korean Application No. 10-2009-0024821, filed on Mar. 24, 2009, and also claims the benefit of U.S. Provisional Application Ser. Nos. 61/119,384, filed on Dec. 3, 2008, and 61/105,784, filed on Oct. 15, 2008, the contents of which are all hereby incorporated by reference herein in their entirety.

TECHNICAL FIELD

The present invention relates to a method for increasing the transmission efficiency of a Sounding Reference Signal (SRS and supporting an uplink multiple antenna technology, using multiple antennas in a mobile wireless communication apparatus.

BACKGROUND ART

In a mobile wireless communication system, a channel is not constant between a transmitter and a receiver. Thus, it is necessary to often measure the channel between a transmission antenna and a reception antenna. When a predefined signal is transmitted and received to measure the channel, the receiver may determine the amplitude decrease and phase shift of the channel using the predefined signal and may feed back the determined information to the transmitter. In addition, the receiver may detect and decode data information reliably based on the determined information. The signal predefined between the transmitter and the receiver may be referred to as a reference signal, a pilot signal, or an SRS.

In the present $3^{rd}$ Generation Partnership Project Long Term Evolution (3GPP LTE) system, a UE with two or more antennas uses a single power amplifier and thus has difficulty in simultaneously transmitting an SRS through two or more antennas. In contrast, a power amplifier is available for each antenna in an LTE-Advanced (LTE-A) system. Accordingly, there exists a need for studying a method for simultaneously transmitting an SRS through two or more antennas.

FIG. 1 illustrates an example in which a UE with two antennas transmits an SRS.

In FIG. 1, the horizontal axis represents frequency and the vertical axis represents time. 'n_SRS' is the index of a time when an SRS is transmitted. Only Orthogonal Frequency Division Multiple Access (OFDMA) symbols carrying SRSs are shown from among OFDMA symbols contiguous in time in FIG. 1, for the convenience's sake of description. For example, other OFDMA symbols may be interposed between OFDMA symbols with index n_SRS=0 and index n_SRS=1, while not shown in FIG. 1.

In FIG. 1, 'Axy' (x=0, 1 and y=0, 1) denotes a Resource Block (RB) allocated to a particular antenna, antenna y of a particular UE, UE x, for transmitting an SRS. Herein, x is the identification number of a UE and y is the identification number of an antenna in each UE. For example, 'A0y' denotes an RB allocated to antenna y of UE 0, and 'A1y' denotes an RB allocated to antenna y of UE 1. In addition, 'Ax0' denotes an RB allocated to antenna 0 of UE x and 'Ax1' denotes an RB allocated to antenna 1 of UE x. Thus, 'A01' denotes an RB allocated to antenna 1 of UE 0.

Referring to FIG. 1, RBs are not allocated simultaneously to antenna 0 and antenna 1 of UE 0. That is, an SRS is not transmitted simultaneously through antenna 0 and antenna 1. For example, RB A00 is allocated to time positions n_SRS=0, 2, 4, and 6 for antenna 0 of UE 0, whereas RB A01 is allocated to time positions n_SRS=1, 3, 5, and 7 for antenna 1 of UE 0. Likewise, RBs are not allocated simultaneously to antenna 0 and antenna 1 of UE 1. That is, Each UE may transmit an SRS using two antennas alternately between time areas, with frequency hopping, as illustrated in FIG. 1.

DISCLOSURE

Technical Problem

An object of the present invention devised to solve the conventional problem is to provide a novel method for efficiently transmitting an SRS through each antenna in a mobile wireless communication system in which a UE has a plurality of antennas.

Technical Solution

In an aspect of the present invention, a method for transmitting an SRS at a UE having a plurality of antennas in a mobile wireless communication system includes mapping a plurality of SRS sequences to the plurality of antennas, the plurality of SRS sequences being different from one another and mutually orthogonal, and transmitting the mapped SRS sequences through the plurality of antennas.

The same SRS bandwidth may be allocated to the plurality of antennas.

One of the plurality of SRS sequences may be created by cyclically shifting another SRS sequence.

One of the plurality of SRS sequences may be created by cyclically shifting another SRS sequence.

The mobile wireless communication system may use a plurality of carriers, and the SRS transmission method may further include receiving information specifying a carrier selected from among the plurality of carriers based on the transmitted SRS.

In another aspect of the present invention, a method for transmitting an SRS at a UE having a plurality of antennas in a mobile wireless communication system includes transmitting a plurality of SRS sequences through the plurality of antennas, different SRS bandwidths being allocated to the plurality of antennas, and transmitting information indicating the different SRS bandwidths allocated to the plurality of antennas.

The different SRS bandwidths allocated to the plurality of antennas may be limited according to a predetermined condition.

The plurality of antennas may be two antennas, the SRS bandwidths may be indicated by four indexes, and the index of an SRS bandwidth allocated to a first antenna may be adjacent to the index of an SRS bandwidth allocated to a second antenna.

The mobile wireless communication system may use a plurality of carriers, and the SRS transmission method may further comprise receiving information specifying a carrier selected from among the plurality of carriers based on the transmitted SRS.

In a further aspect of the present invention, a method for transmitting an SRS at a UE having a plurality of antennas in a mobile wireless communication system includes pre-processing an SRS sequence to be transmitted through the plurality of antennas by precoding the SRS sequence, the same SRS bandwidth being allocated to the plurality of antennas, and transmitting the pre-processed SRS sequence through the plurality of antennas.

During the pre-processing, a different precoding matrix may be used for a different SRS transmission period.

The pre-processing may include performing cyclic delay diversity on the SRS sequence.

The mobile wireless communication system may use a plurality of carriers, and the SRS transmission method may further include receiving information specifying a carrier selected from among the plurality of carriers based on the transmitted SRS.

The pre-processing and the SRS sequence transmission may be performed independently for each of the plurality of carriers.

Different carriers from among the plurality of carriers may be mapped to the plurality of antennas at a predetermined SRS transmission time.

Advantageous Effects

According to the present invention, as a UE with a plurality of antennas efficiently transmits an SRS through each of the antennas, channel estimation can be efficiently carried out for the plurality of antennas.

BEST MODE FOR CARRYING OUT THE INVENTION

Figure 1:
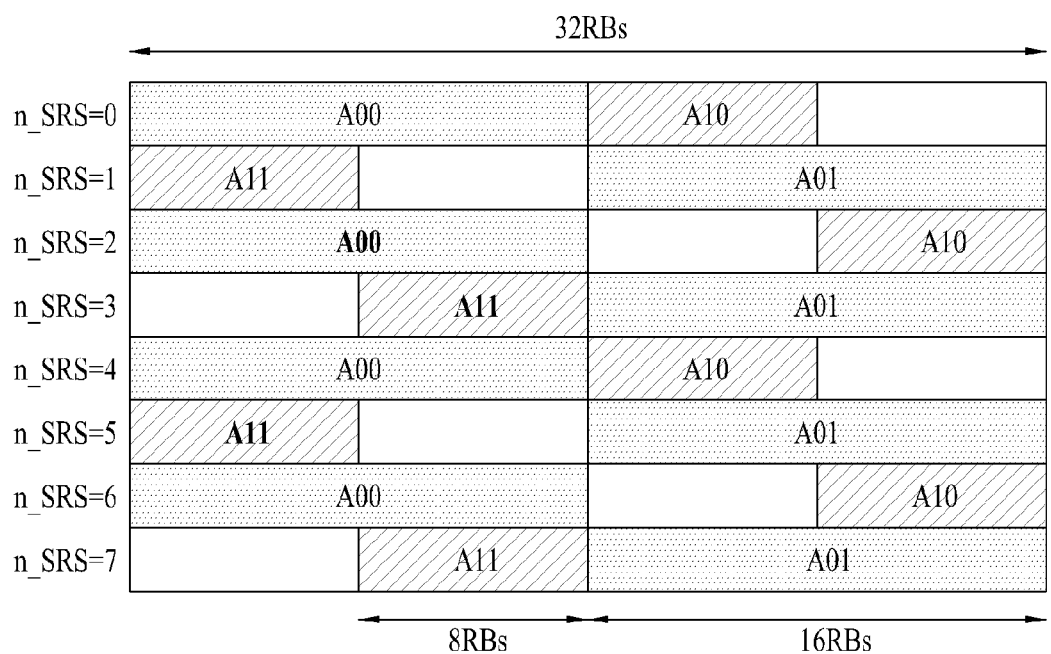
FIG. 1 illustrates an example in which a User Equipment (UE) having two antennas transmits a Sounding Reference Signal (SRS) through the two antennas.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Reference will now be made in detail to the preferred embodiments of the present invention with reference to the accompanying drawings. Also, wherever possible, the same reference numbers will be used throughout the drawings and the specification to refer to the same or like parts.

A Sounding Reference Signal (SRS) sequence may be defined according to $r^{SRS}(n) = r_{u,v}^{(\alpha)}(n)$ where $r_{u,v}^{(\alpha)}(n) = e^{j\alpha n} \bar{r}_{u,v}(n)$, $0 \leq n \leq M_{sc}^{RS}$. Base sequences $\bar{r}_{u,v}(n)$ may be divided into groups, where $u \in \{0, 1, \ldots, 29\}$ is a group number and v is the number of base sequences within a group. Among these groups, a group satisfying a base sequence length $M_{sc}^{RS} = mN_{sc}^{RB}$, $1 \leq m \leq 5$ contains one base sequence (v=0) and a group satisfying a base sequence length $M_{sc}^{RS} = mN_{sc}^{RB}$, $6 \leq m \leq N_{RB}^{max,UL}$ contains two base sequences (v=0,1). The cyclic shift $\alpha^{SRS}$ of the SRS is given as $$\alpha = 2\pi \frac{n_{SRS}}{8} \quad \text{[Equation 1]}$$

where $n_{SRS}$ (=0, 1, 2, 3, 4, 5, 6, 7) may be configured by a higher layer.

The SRS sequence $r^{SRS}(0), \ldots, r^{SRS}(M_{sc,b}^{RS}-1)$ may be multiplied by an amplitude scaling factor $\beta_{SRS}$ □ and then mapped to resource elements (k, l), starting with $r^{SRS}(0)$ according to [Equation 2].

$$a_{2k+k_0,l} = \begin{cases} \beta_{SRS} r^{SRS}(k) & k = 0, 1, \ldots, M_{sc,b}^{RS}-1 \\ 0 & \text{otherwise} \end{cases} \quad \text{[Equation 2]}$$

where $k_0$ is the frequency-domain starting position of the SRS and $M_{sc,b}^{RS}$ is the length of the SRS defined as $$M_{sc,b}^{RS} = m_{SRS,b} N_{sc}^{RB}/2 \quad \text{[Equation 3]}$$

For each uplink bandwidth $N_{RB}^{UL}$, $m_{SRS,b}$ is given by Table 1 to Table 4.

TABLE 1

| SRS bandwidth configuration | SRS-Bandwidth b = 0 | | SRS-Bandwidth b = 1 | | SRS-Bandwidth b = 2 | | SRS-Bandwidth b = 3 | |
|---|---|---|---|---|---|---|---|---|
| | $m_{SRS,b}$ | $N_b$ | $m_{SRS,b}$ | $N_b$ | $m_{SRS,b}$ | $N_b$ | $m_{SRS,b}$ | $N_b$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |

TABLE 1-continued

| SRS bandwidth configuration | SRS-Bandwidth b = 0 | | SRS-Bandwidth b = 1 | | SRS-Bandwidth b = 2 | | SRS-Bandwidth b = 3 | |
|---|---|---|---|---|---|---|---|---|
| | $m_{SRS,b}$ | $N_b$ | $m_{SRS,b}$ | $N_b$ | $m_{SRS,b}$ | $N_b$ | $m_{SRS,b}$ | $N_b$ |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

TABLE 2

| SRS bandwidth configuration | SRS-Bandwidth b = 0 | | SRS-Bandwidth b = 1 | | SRS-Bandwidth b = 2 | | SRS-Bandwidth b = 3 | |
|---|---|---|---|---|---|---|---|---|
| | $m_{SRS,b}$ | $N_b$ | $m_{SRS,b}$ | $N_b$ | $m_{SRS,b}$ | $N_b$ | $m_{SRS,b}$ | $N_b$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

TABLE 3

| SRS bandwidth configuration | SRS-Bandwidth b = 0 | | SRS-Bandwidth b = 1 | | SRS-Bandwidth b = 2 | | SRS-Bandwidth b = 3 | |
|---|---|---|---|---|---|---|---|---|
| | $m_{SRS,b}$ | $N_b$ | $m_{SRS,b}$ | $N_b$ | $m_{SRS,b}$ | $N_b$ | $m_{SRS,b}$ | $N_b$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

TABLE 4

| SRS bandwidth configuration | SRS-Bandwidth b = 0 | | SRS-Bandwidth b = 1 | | SRS-Bandwidth b = 2 | | SRS-Bandwidth b = 3 | |
|---|---|---|---|---|---|---|---|---|
| | $m_{SRS,b}$ | $N_b$ | $m_{SRS,b}$ | $N_b$ | $m_{SRS,b}$ | $N_b$ | $m_{SRS,b}$ | $N_b$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

Table 1 to Table 4 list the values of $m_{SRS,b}$ and $N_b$, respectively for uplink bandwidths $6 \leq N_{RB}^{UL} \leq 40$, $40 < N_{RB}^{UL} \leq 60$, $60 < N_{RB}^{UL} \leq 80$, and $80 < N_{RB}^{UL} \leq 110$. A cell-specific parameter 'SRS bandwidth configuration' and a UE-specific parameter 'SRS-Bandwidth' $B_{SRS} \in \{0, 1, 2, 3\}$ may be determined by higher layers. Herein, it may be said that $b = B_{SRS}$. The frequency-domain starting position $k_0$ may be defined by $$k_0 = k'_0 + \sum_{b=0}^{B_{SRS}} 2M_{sc,b}^{RS} n_b \quad \text{[Equation 4]}$$

where $k'_0 = (\lfloor N_{RB}^{UL}/2 \rfloor - m_{SRS,0}/2) N_{SC}^{RB} + k_{TC}$, $k_{TC} \in \{0,1\}$ is an offset determined by a 'transmission comb' parameter, and $n_b$ is the index of a frequency position.

Frequency hopping of the SRS is configured by an "SRS hopping bandwidth", $b_{hop} \in \{0, 1, 2, 3\}$, provided by higher layers. If frequency hopping of the SRS is not enabled (i.e. when the hopping bandwidth of the SRS is equal to or larger than the bandwidth of the SRS, $b_{hop} \geq B_{SRS}$, the frequency position index $n_b$ remains constant and is defined $n_b = \lfloor 4n_{RRC}/m_{SRS,b} \rfloor \mod N_b$. $n_{RRC}$ is given by higher layers for a UE.

On the contrary, if frequency hopping of the SRS is enabled (i.e. $b_{hop} < B_{SRS}$), the frequency position index $n_b$ may be defined by $$n_b = \begin{cases} \lfloor 4n_{RRC}/m_{SRS,b} \rfloor \mod N_b & b \leq b_{hop} \\ \{F_b(n_{SRS}) + \lfloor 4n_{RRC}/m_{SRS,b} \rfloor\} \mod N_b & \text{otherwise} \end{cases} \quad \text{[Equation 5]}$$

where $n_b$ is given by Table 1 to Table 4.

In [Equation 5], $F_b(n_{SRS})$ may be given by $$F_b(n_{SRS}) = \quad \text{[Equation 6]}$$

$$\begin{cases} (N_b/2) \left\lfloor \dfrac{n_{SRS} \mod \prod_{b'=b_{hop}}^{b} N_{b'}}{\prod_{b'=b_{hop}}^{b-1} N_{b'}} \right\rfloor + \left\lfloor \dfrac{n_{SRS} \mod \prod_{b'=b_{hop}}^{b} N_{b'}}{2 \prod_{b'=b_{hop}}^{b-1} N_{b'}} \right\rfloor \\ \quad \text{if } N_b \text{ even} \\ \lfloor N_b/2 \rfloor \left\lfloor n_{SRS} / \prod_{b'=b_{hop}}^{b-1} N_{b'} \right\rfloor \\ \quad \text{if } N_b \text{ odd} \end{cases}$$

$N_{b_{hop}} = 1$ regardless of the $N_b$ value and $n_{SRS} = \lfloor (n_f \times 10 + \lfloor n_s/2 \rfloor)/T_{SRS} \rfloor$ counts the number of UE-specific SRS transmissions. $T_{SRS}$ is the UE-specific periodicity of SRS transmission.

The SRS is transmitted in the last symbol of a subframe.

Table 5 and Table 6 illustrate cell-specific subframe configuration periods and cell-specific subframe offsets relative to a frame, for transmission of SRSs.

TABLE 5

| Configuration | Binary | Configuration Period (subframes) | Transmission offset (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |

TABLE 5-continued

| Configuration | Binary | Configuration Period (subframes) | Transmission offset (subframes) |
|---|---|---|---|
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | Inf | N/A |

TABLE 6

| Configuration | Binary | Configuration Period (sub-frames) | Transmission offset (sub-frames) |
|---|---|---|---|
| 0 | 0000 | 5 | {1} |
| 1 | 0001 | 5 | {1, 2} |
| 2 | 0010 | 5 | {1, 3} |
| 3 | 0011 | 5 | {1, 4} |
| 4 | 0100 | 5 | {1, 2, 3} |
| 5 | 0101 | 5 | {1, 2, 4} |
| 6 | 0110 | 5 | {1, 3, 4} |
| 7 | 0111 | 5 | {1, 2, 3, 4} |
| 8 | 1000 | 10 | {1, 2, 6} |
| 9 | 1001 | 10 | {1, 3, 6} |
| 10 | 1010 | 10 | {1, 6, 7} |
| 11 | 1011 | 10 | {1, 2, 6, 8} |
| 12 | 1100 | 10 | {1, 3, 6, 9} |
| 13 | 1101 | 10 | {1, 4, 6, 7} |
| 14 | 1110 | Inf | N/A |
| 15 | 1111 | reserved | reserved |

Table 5 illustrates Frequency Division Duplex (FDD) subframe configurations for SRSs and Table 6 illustrates Time Division Duplex (TDD) subframe configurations for SRSs.

The following SRS parameters are UE-specific ones that are semi-statically determined by higher layers.

Transmission comb
Starting physical RB assignment
Duration of SRS transmission: single or indefinite (until disabled)
SRS configuration index $I_{SRS}$ for SRS periodicity and SRS subframe offset
SRS bandwidth
Frequency hopping bandwidth
Cyclic shift An SRS transmission band does not include an uplink control channel region.

When a UE supporting antenna selection can select an antenna, index $\alpha(n_{SRS})$ indicates an antenna carrying an SRS at time $n_{SRS}$ from among a plurality of antennas of the UE. If frequency hopping is not enabled for a whole or partial sounding band (i.e. $b_{hop} \geq B_{SRS}$), the index $\alpha(n_{SRS})$ is given as [Equation 7]. If frequency hopping is enabled for the whole or partial sounding band (i.e. $b_{hop} < B_{SRS}$), the index $\alpha(n_{SRS})$ is given as [Equation 8].

$$a(n_{SRS}) = n_{SRS} \bmod 2 \quad [\text{Equation 7}]$$

$$a(n_{SRS}) = \begin{cases} (n_{SRS} + \lfloor n_{SRS}/2 \rfloor + \beta \cdot \lfloor n_{SRS}/K \rfloor) \bmod 2 & \text{when } K \text{ is even} \\ n_{SRS} \bmod 2 & \text{when } K \text{ is odd} \end{cases} \quad [\text{Equation 8}]$$

$$\beta = \begin{cases} 1 & \text{where } K \bmod 4 = 0 \\ 0 & \text{otherwise} \end{cases}$$

Except when the UE performs single SRS transmission, K is defined as $$K = \prod_{b'=b_{hop}}^{B_{ERS}} N_{b'}.$$

Regardless of the $N_b$ value, $N_{b_{hop}} = 1$.

In the current LTE system, a UE having two antennas selects an antenna according to index $\alpha(n_{SRS})$ and time $n_{SRS}$, and transmits an SRS through the selected antenna. For example, let the indexes of two antennas at UE k be denoted by $A_{k0}$ and $A_{k1}$, respectively. It is assumed that two UEs (k=0 and k=1) use bandwidth configurations corresponding to SRS BW b=1 and SRS BW b=2 in Table 7. Table 7 below illustrates SRS bandwidth configurations.

TABLE 7

| SRS BW b = 0 | | SRS BW b = 1 | | SRS BW b = 2 | | SRS BW b = 3 | |
|---|---|---|---|---|---|---|---|
| $m_{SRS,b}$ | $N_b$ | $m_{SRS,b}$ | $N_b$ | $m_{SRS,b}$ | $N_b$ | $m_{SRS,b}$ | $N_b$ |
| 32 | 1 | 16 | 2 | 8 | 2 | 4 | 2 |

As stated before, when receiving an SRS in the manner illustrated in FIG. 1, a receiver can identify a transmission antenna that transmitted the SRS from among a plurality of transmission antennas, according to the reception frequency band of the SRS.

Compared to the SRS transmission method of FIG. 1 in which a UE alternately selects antennas for SRS transmission, the present invention provides a method for simultaneously transmitting an SRS through two or more antennas.

According to an embodiment of the present invention, different SRS sequences may be allocated to two or more antennas in order to simultaneously transmit an SRS through two antennas.

For simultaneous SRS transmission through two antennas, sequences needed for SRS transmission should be allocated to the two antennas. The simultaneous SRS transmission may be facilitated by allocating different sequences to the antennas. UE sequence information includes a group index u∈{0, 1, . . . , 29}, the number v of base sequences in the group, a UE-specific bandwidth, and a cyclic shift. For a UE with two or more antennas, different sequences may be allocated to the antennas in accordance with any of Embodiment 1, Embodiment 2 and Embodiment 3 of the present invention which will be described below. While for the convenience' sake of description, Embodiment 1 and Embodiment 2 are described in the context of a UE with two antennas, it is to be clearly understood that they can be extended to three or more antennas.

<Embodiment 1>

Method A of the present invention is applicable to a case where the same base sequence and UE-specific bandwidth are used for a plurality of antennas but a different cyclic shift is used for each antenna. The term as used herein, "UE-specific bandwidth" refers to an SRS bandwidth allocated to each antenna.

Although the same base sequence and the same SRS bandwidth are used for two antennas of a UE, different sequences with different cyclic shifts are allocated to the two antennas. According to Embodiment 1, there is no need for allocating an additional bit to signaling from a transmitter to notify a receiver of an antenna that has transmitted a particular SRS sequence among a plurality of transmission antennas.

In Embodiment 1, as a cyclic shift allocated to a second antenna is different from a cyclic shift allocated to a first antenna by a predetermined value, SRS sequences transmitted through the two transmission antennas have orthogonality. However, if a delay spread is long, the orthogonality between the two SRS sequences is more probable to be lost with a less difference between the cyclic shifts between the two SRS sequences. The impaired orthogonality makes it impossible to distinguish the SRS sequences transmitted through the two antennas from each other. Moreover, because these SRS sequences are transmitted in the same frequency band at the same time, the antenna through which a particular SRS sequence was transmitted cannot be identified between the two antennas. Accordingly, to maintain orthogonality between the two SRS sequences even against a long delay spread, it is preferred that once a cyclic shift is determined for the first antenna, a cyclic shift different from the cyclic shift of the first antenna by a predetermined value is selected for the second antenna. For instance, in the case where cyclic shift values 0 to 7 are available as in [Equation 1], if cyclic shift 0 is determined for the first antenna, cyclic shift 3 may be selected for the second antenna.

The above use of predetermined cyclic shift values obviates the need for transmitting an additional bit to distinguish different SRS sequences allocated to the two antennas. In this manner, a legacy LTE UE and an LTE-A UE can receive SRSs from the same BS without additional signaling.

<Embodiment 2>

In accordance with Embodiment 2, while the same UE-specific bandwidth is used for a plurality of antennas, different base sequences or sequences from different groups are applied to the antennas.

Compared to Embodiment 1 in which the same base sequence is allocated to two antennas, different base sequences or sequences from different groups may be signaled through the two antennas in Embodiment 2. Since predetermined different groups or different sequences are allocated to the two antennas, the different sequences of the two antennas can be distinguished from each other without additional bit signaling. Similarly to Embodiment 1, different cyclic shift values may be used for the antennas. Even though the same cyclic shift value is used for the two antennas, the SRS sequences of the two antennas can basically be distinguished because of different groups and base sequences.

<Embodiment 3>

Embodiment 3 of the present invention can be implemented when different UE-specific bandwidths are applied to a plurality of antennas.

Figure 2:
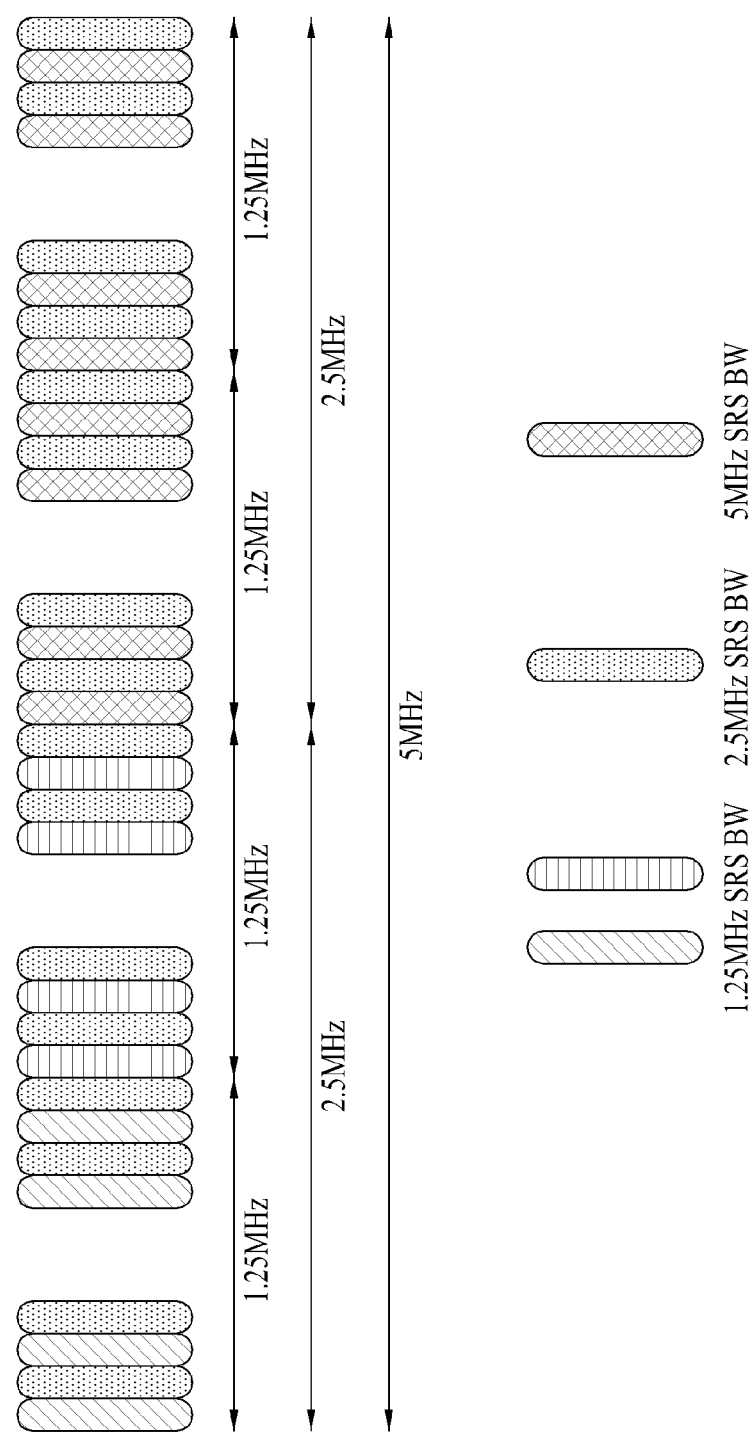
FIG. 2 illustrates exemplary hopping patterns for transmitting SRSs, in the case where each UE has a different UE-specific bandwidth.

FIG. 2 illustrates exemplary hopping patterns for transmitting SRSs, when each UE has a different UE-specific bandwidth. While each UE is allocated a different SRS bandwidth in FIG. 2, Embodiment 3 is based on the assumption that different SRS bandwidths are allocated to a plurality of antennas of a single UE.

Embodiment 3 is similar to Embodiment 1 in some aspects but different from Embodiment 1 in that when two antennas have different UE-specific bandwidths, a sequence value may be allocated to a second antenna based on a variation with respect to the UE-specific bandwidth of a first antenna. For example, four different SRS bandwidths are available for each antenna. As listed in Table 1 to Table 4, four different SRS bandwidths may be indicated by index V. That is, the SRS bandwidths may be indicated by SRS BW b=0, SRS BW b=1, SRS BW b=2 and SRS BW b=3. In the case where different SRS bandwidths are allocated to two antennas, 12 combinations may be produced out of the available SRS bandwidths. Let the indexes of the SRS bandwidths of first and second antennas be denoted by b0 and b1, respectively. Then (b0, b1) may be any of {(0,1), (0,2), (0, 3), (1, 0), (1, 2), (1, 3), (2, 0), (2, 1), (2, 3), (3, 0), (3,1), (3,2)}. Since Method C) is based on the assumption of different SRS bandwidths for different antennas, none of the combinations (0, 0), (1, 1), (2, 2) and (3, 3) can be (b0, b1). Four bits are required to express 12 cases. Or if four different SRS bandwidths can be allocated to each antenna, two bits are required to specify an SRS bandwidth allocated to the first antenna and two more bits are required to specify an SRS bandwidth allocated to the second antenna. Thus a total of four bits are needed.

If the UE-specific bandwidths of the two antennas of the UE are adjacent, that is, if the four SRS bandwidths are arranged in the order of their indexes and two SRS bandwidths having adjacent indexes are allocated to the two antennas, two bits are needed to specify an SRS bandwidth allocated to the first antenna and another one bit is needed to specify an SRS bandwidth allocated to the second antenna. Thus three bits in total are necessary. For example, given the SRS bandwidth of the first antenna as b=1, if the added one bit is 0, the SRS bandwidth of the second antenna is SRS BW b=0. If the added one bit is 1, the SRS bandwidth of the second antenna is SRS BW b=2. Similarly, given the SRS bandwidth of the first antenna as SRS BW b=3, if the added one bit is 0, the SRS bandwidth of the second antenna is SRS BW b=2. If the added one bit is 1, the SRS bandwidth of the second antenna is SRS BW b=1. In this manner, it may be regulated preliminarily that SRS bandwidths with adjacent indexes are allocated to two antennas of a UE. An SRS is transmitted through the second antenna in an SRS bandwidth adjacent to the SRS bandwidth of the first antenna, within the same symbol. If the difference between the SRS bandwidths of the two antennas is wide, the resulting increase of the difference between the transmission periods of the first and second antennas brings about loss.

Or the indexes of SRS bandwidths may not be limited for the second antenna in order to increase the freedom of allocating an SRS sequence to the second antenna. Then, two bits may be used to express an SRS bandwidth allocated to the second antenna (only when four SRS bandwidths are available).

For other base sequences or groups, signaling may be performed in the above manner. That is, a sequence can be allocated to the second antenna using a predefined group or sequence value. As stated before, different cyclic shifts may be allocated to the two antennas. Due to different groups and base sequences for the two antennas, the SRS sequences of the two antennas can be distinguished in spite of the same cyclic shift for them.

SRSs can be simultaneously transmitted in Code Division Multiplexing (CDM) through a plurality of antennas at a UE in accordance with Embodiment 1 or Embodiment 2. When the UE transmits different SRS sequences in the same UE-specific bandwidth through the plurality of antennas, it may CDM-multiplex the SRSs. As SRSs are transmitted through a plurality of antennas, for example, two antennas, to which different code sequences are allocated, channel information about the bandwidths of the two antennas is known simultaneously. With this method, a half of an SRS transmission period required for a conventional frequency hopping pattern is sufficient for acquiring channel information about the total SRS bandwidth of the two antennas.

According to Embodiment 3, SRSs can be transmitted simultaneously in FDM through a plurality of antennas. When the plurality of antennas of the UE have different UE-specific bandwidths, each antenna transmits an SRS in a UE-specific bandwidth allocated to the antenna. Therefore, channel information about the plurality of antennas is known from the SRSs in a shorter time. In this case, the same or different sequences may be allocated to the two antennas.

It may further be contemplated that a bandwidth allocated to two antennas is divided into equal halves, sequences are generated for the divided bandwidths, and the sequences are transmitted in the divided bandwidths. For instance, when 16 RBs are allocated to a UE with two antennas, for SRS transmission, the 16 RBs are divided into two sets of 8 RBs, 8 RBs are allocated to each of the two antennas, and a sequence corresponding to 8 RBs is generated and transmitted in 8 RBs allocated to each antenna. In this manner, a frequency hopping pattern designed for up to 20 Mhz in the legacy LTE system can be extended to 40 Mhz.

If the same SRS bandwidth and the same SRS sequence are allocated to a plurality of antennas, an SRS can be transmitted simultaneously through the antennas in a combining scheme such as precoding, cyclic delay diversity, etc. The term as used herein 'combining scheme' refers to transmission of the same SRS sequence in the same SRS bandwidth through a plurality of antennas at a given time after the SRS sequence is processed through precoding, cyclic delay diversity, etc. in order to provide information about channels of the antennas. That is, when the same UE-specific SRS bandwidth and the same SRS sequence are allocated to each antenna, the SRS is transmitted simultaneously through the antennas using the combining scheme. Therefore, channel information about the plurality of antennas in the corresponding bands is known from one SRS transmission. Consequently, the conventional SRS transmission period can be reduced to a half. For example, an SRS may be transmitted in the manner illustrated in FIG. 3, compared to FIG. 1.

Figure 3:
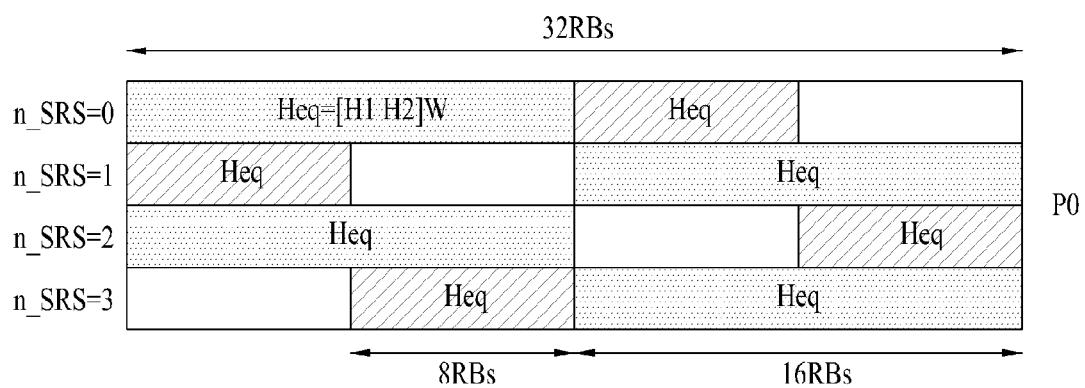
FIG. 3 illustrates an exemplary SRS sequence mapping structure for use in transmitting an SRS through a combining scheme according to the present invention.

FIG. 3 illustrates an exemplary SRS sequence mapping structure for transmitting an SRS in a combining scheme according to the present invention.

Referring to FIG. 3, the horizontal axis represents frequency and the vertical axis represents time. As done in FIG. 1, only OFDMA symbols carrying an SRS are shown from among OFDMA symbols successive in time in FIG. 3. For instance, other OFDMA symbols may be interposed between OFDMA symbols with indexes n_SRS=0 and n_SRS=1, while not shown. In FIG. 3, areas to which SRSs for two UEs are mapped are shown. 16 RBs (shaded areas) of an OFDMA symbol are allocated for SRS transmission of UE 0 and 8 RBs of an OFDMA symbol are allocated for SRS transmission of UE 1. Compared to FIG. 1 in which different time-frequency resources are allocated to two antennas of a single UE, for SRS transmission, the same time-frequency resources are allocated to two antennas of a single UE in FIG. 3.

<Embodiment 4>

According to an embodiment of the present invention using a combining scheme, an SRS can be transmitted through a plurality of antennas by precoding the same sequence (sequences using the same u and v, the same UE-specific bandwidth, and the same cyclic shift) for the antennas. When a UE transmits an SRS sequence using a precoding matrix W through a plurality of antennas, a BS may acquire channel information about two antennas in the corresponding SRS bandwidth. That is, if the UE transmits an SRS through the plurality of antennas by applying the same precoding matrix to the antennas, the BS may obtain the equivalent channels $H_{eq}$ of channels corresponding to the plurality of antennas. The UE may apply an efficient uplink precoding matrix to the plurality of antennas using information about these equivalent channels. That is, the BS may select an appropriate precoding matrix index for the current uplink based on the equivalent channels that the BS has calculated using the precoded SRS received from the UE, and thus may notify the UE of the selected precoding matrix index so that the UE can use an appropriate precoding matrix for uplink data transmission. The index of a precoding matrix used for the SRS transmission may be indicated by the BS or autonomously selected by the UE. As the precoded SRS is transmitted in this manner, an SRS transmission period during which to monitor channels over a total bandwidth can be reduced and an optimal precoding matrix index can be determined for equivalent channels of the plurality of antennas of the UE.

When the UE transmits a precoded SRS through the plurality of antennas, the BS receives a signal expressed as $$y=[H_1 \ldots H_n]Ws+n=HWs+n \qquad \text{[Equation 9]}$$

Where $H_n$ represents an uplink channel experienced by each channel, W represents a precoding matrix applied to the plurality of antennas, s represents an SRS sequence, y represents the signal received at the BS, and n represents noise.

The above-described SRS transmission based on a single precoding matrix reduces an SRS transmission period and enables use of an appropriate uplink precoding matrix. Despite these advantages, it is difficult to acquire information about the independent channel of each antenna. To find out the channel information of each antenna, an SRS needs to be transmitted using as many precoding matrices as the number of antennas that transmit the SRS, that is, the plurality of antennas. Thus the independent channel information of each channel can be obtained from the SRS. For example, a UE with two antennas transmits an SRS using two precoding matrices so that a BS may acquire independent channel information of each antenna. Similarly, for a UE with four antennas, four precoding matrices are required.

In the present invention, a precoding vector set may be used in a similar manner.

Figure 4:
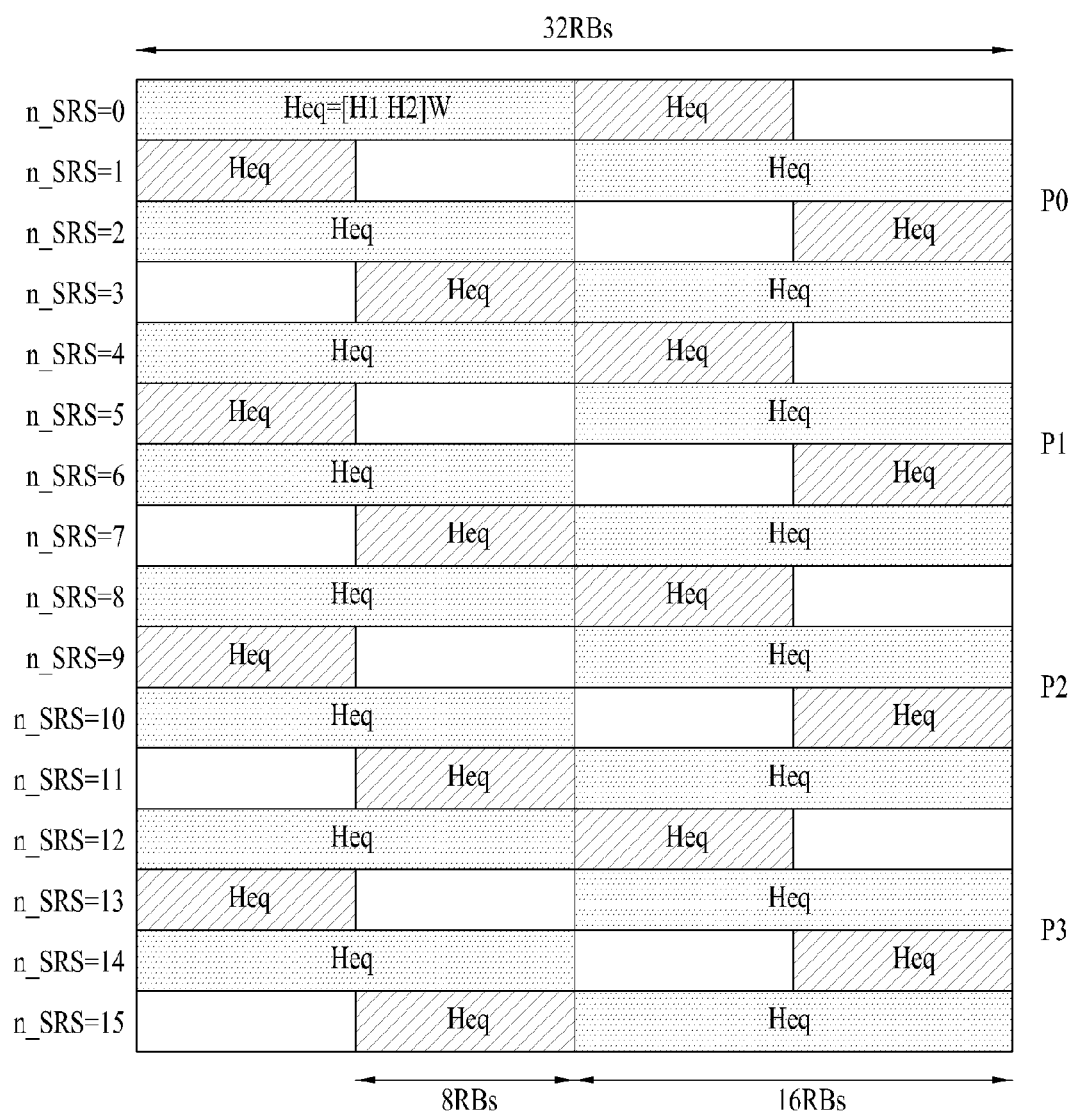
FIG. 4 illustrates an exemplary resource allocation for transmitting an SRS using a precoding vector set.

FIG. 4 illustrates an exemplary resource allocation for transmitting an SRS using a precoding vector set.

Referring to FIG. 4, an SRS can be transmitted by sequentially applying a precoding vector set over a plurality of SRS transmission periods. For example, given a precoding vector set including P0, P1, P2 and P3, the precoding matrix indexes of the precoding vector set, (P0, P1, P2 and P3) are sequentially used for the SRS transmission periods according to the combing scheme of FIG. 3. According to this scheme, the index of an optimal uplink precoding matrix as well as the equivalent channels of the plurality of antennas corresponding to the SRS bandwidth and their independent channel information can be acquired.

<Embodiment 5>

In accordance with an embodiment of the present invention using a combining scheme, an SRS may be transmitted through a plurality of antennas using cyclic delay diversity as well as the above-described precoding. This scheme may offer benefits such as a frequency selective gain, a scheduling gain, etc. in addition to the afore-described advantages.

When a UE transmits an SRS through a plurality of antennas after applying precoding and cyclic delay diversity to the SRS, a BS receives a signal expressed as $$y=[H_1 \ldots H_n]WDs+n=HWDs+n \qquad \text{[Equation 10]}$$

where $H_n$ represents a channel experienced by each antenna, W represents a precoding matrix applied to the plurality of antennas, D represents a cyclic delay diversity matrix, s represents an SRS sequence, y represents the signal received at the BS, and n represents noise.

The above-described cyclic delay diversity-based SRS transmission through a plurality of antennas may be carried out using a large or small cyclic delay diversity. If an SRS is transmitted through a large cyclic delay diversity and precoding, a frequency selective gain may be additionally obtained. The large cyclic delay diversity scheme performs well for a fast UE as well as a slow UE. On the other hand, if an SRS is transmitted using a small cyclic delay diversity and precoding, complexity is decreased and a scheduling gain may be additionally obtained. A cyclic delay diversity value may be signaled to the UE by the BS or selected by the UE, for SRS transmission.

A description will be given of a method for transmitting an SRS through a plurality of antennas in a carrier aggregation environment.

For an uplink using Single carrier Frequency Division Multiple Access (SC-FDMA), a single carrier or an aggregation of a plurality of carriers may be used. The term 'carrier aggregation' refers to use of a plurality of carriers.

Extensive research has recently been conducted on multi-carrier transmission in order to increase uplink/downlink throughput. Because an SRS is designed for single-carrier transmission in a legacy system, there exists a need for defining a new SRS transmission method suitable for multi-carrier transmission. In addition, when multiple carriers are used to increase link throughput in a multi-antenna system, a new multi-antenna/multi-carrier SRS transmission method should be also designed.

Now a description will be given of a method for allocating an appropriate carrier to a UE based on channel information acquired from an SRS received from the UE according to another embodiment of the present invention.

While a BS may allocate any carrier to a UE without channel information about the UE, it may allocate a carrier to the UE based on channel information acquired from an SRS. The BS can allocate a carrier in good channel state to the UE according to the channel information-based carrier allocation scheme, thereby increasing uplink throughput.

If a unit carrier has a bandwidth of K MHz, the system bandwidth of a BS having M unit carriers is KM MHz. A UE capable of multi-carrier transmission may transmit a signal on each unit carrier or simultaneously on a few carriers randomly selected from among multiple carriers. For the convenience's sake of description, it is assumed that K=20 and M=4. K and M may vary according to systems.

The UE may initially transmit an SRS on all carriers, that is, Carrier 1, Carrier 2, Carrier 3 and Carrier 4 each having 20 MHz (K=20 MHz). Even though a particular one of the four carriers is allocated to the UE for data transmission, the UE may transmit an SRS on unallocated carriers to enable the BS to acquire channel state information about the UE. The BS may estimate channels based on the received SRS and acquire channel state information about the carriers based on the estimated channels. The BS may utilize the acquired channel state information in allocating a carrier to the UE.

<Embodiment 6>

According to another embodiment of the present invention, a UE may transmit an SRS on different carriers through different transmission antennas in a carrier aggregation environment.

For example, Carrier 1 and Carrier 2 are mapped to first and second antennas, respectively and the UE transmits the same SRS sequence in the same SRS bandwidth through the first and second antennas, at a first SRS transmission time. The SRS may be transmitted for a short time in a wide SRS bandwidth such as SRS BW b=0 or SRS BW b=1. At the next SRS transmission time, the UE may transmit an SRS sequence by mapping Carrier 3 and Carrier 4 to the first and second antennas. The BS may allocate a carrier to the UE based on the received SRS. In addition, if the UE uses four antenna ports, it may simultaneously transmit an SRS on Carrier 1, Carrier 2, Carrier 3 and carrier 4. When the BS allocates a carrier to the UE based on information acquired from SRS sequences, it does not need to get knowledge of accurate channel information about each antenna. Therefore, SRS transmission using the combining scheme among the afore-described simultaneous multi-antenna SRS transmission schemes in combination with this embodiment is favorable in terms of carrier allocation. That is, if the UE transmits an SRS in the combining scheme, the BS may obtain information about the equivalent channel of each carrier for a short transmission time. The BS may allocate a carrier to the UE based on the equivalent channel of each carrier.

<Embodiment 7>

According to another embodiment of the present invention, a UE with a plurality of antennas may transmit an SRS on a plurality of carriers in a carrier aggregation environment.

The UE may generate another sequence by cyclically shifting a base sequence allocated to a first antenna by a predetermined shift value and allocate the generated sequence to a second antenna. Or the UE may allocate a sequence having a different SRS bandwidth to the second antenna. Or the UE may transmit SRSs on different carriers through two antennas using the same SRS sequence and the same SRS bandwidth. For example, the UE may be allocated Carrier 1 and Carrier 2 each having 20 MHz and may transmit an SRS on Carrier 1 and Carrier 2. In this case, a total of 40 MHz is allocated to the UE. The UE may transmit an SRS on Carrier 1 through the first antenna and transmit an SRS on carrier 2 through the second antenna in the same hopping pattern. Then to allow the BS to determine channel information about each antenna for each carrier, the UE may then transmit an SRS on Carrier 2 through the first antenna and transmit an SRS on Carrier 1 through the second antenna in the same hopping pattern.

For instance, it may be assumed that Carrier 1, Carrier 2, Carrier 3 and Carrier 4 each having 20 MHz, that is, a total of 80 MHz is allocated to the UE and the UE transmits an SRS through four antennas. Then the UE may transmit an SRS on Carrier 1 through a first antenna, and may transmit SRSs on Carrier 2, Carrier 3 and Carrier 4 through second, third and fourth antennas, respectively in the same hopping pattern. Then to allow the BS to determine channel information about each antenna for each carrier, the UE may transmit an SRS on Carrier 2 through the first antenna, transmit an SRS on Carrier 1 through the second antenna, transmit an SRS on Carrier 4 through the third antenna, and transmit an SRS on Carrier 3 through the fourth antenna, in the same hopping pattern. In this manner, the UE may transmit an SRS through the four antennas by changing a carrier for each antenna at each time.

The BS may acquire channel information about the plurality of carriers based on the SRS received from the UE. The UE may allocate different sequences to different antennas according to the channel states of the carriers and may transmit an SRS using different sequences and SRS bandwidths for the carriers according to the channel states of the carriers.

In the carrier aggregation environment, besides the method for transmitting an SRS on different carriers through a plurality of antennas, a multi-antenna SRS transmission method based on CDMA, FDMA, a combining scheme, etc. may be applied to each carrier. That is, the UE may simultaneously transmit an SRS through a plurality of antennas on each carrier by sequentially changing from one carrier to another at each time. SRS transmission may be switched between carriers by transmitting an SRS on another carrier after transmitting an SRS on one carrier, or by alternating carriers between SRS symbols. For example, on the assumption that an SRS is transmitted once over four SRS symbols through two antennas on either of Carrier 1 and Carrier 2, the UE may transmit an SRS over four SRS symbols through the antennas on Carrier 1 and then an SRS over next four SRS symbols through the antennas on Carrier 2. Alternatively, the UE may transmit an SRS in a first SRS symbol through the antennas on Carrier 1 and then an SRS in the next SRS symbol through the antennas on Carrier 2.

Similarly, in case of four antennas under the carrier aggregation environment, besides the method for transmitting an SRS on different carriers through a plurality of antennas, a multi-antenna SRS transmission method based on non-precoding or 4-antenna precoded SRS transmission may be applied to each carrier.

If an uplink configuration carrier is defined as a 'primary carrier', most of communication may be conducted on the primary carrier and a 'non-primary carrier' may be used as an extension or for measurement to select a primary carrier. In this case, if a UE transmits an SRS, SRS transmission on the primary uplink configuration carrier may be performed in a different manner from SRS transmission on a non-primary uplink configuration carrier. Various cases as illustrated in Table 8 may be considered.

and transmitting SRS sequences through the transmission antennas according to another embodiment of the present invention.

In the embodiment of the present invention, different SRS bandwidths (SRS BW b=0 and SRS BW b=1) may be allocated to a plurality of antennas, for example, two antennas of a UE. In this embodiment, the UE may transmit allocation information indicating an SRS bandwidth allocated to each antenna to the BS (S600). The UE may transmit the SRS sequences in the different SRS bandwidths (SRS BW b=0, SRS BW b=1) in FDM through the antennas (S601). To reduce the transmission overhead resulting from the allocation information, SRS bandwidth combinations available for the plurality of antennas may be limited, as stated before.

Upon receipt of the SRS sequences from the UE, the BS may detect the SRS sequences in FDM based on the allocation information (S602). To determine a frequency band in which an SRS sequence is transmitted, the BS may use SRS bandwidth allocation information received from the UE.

Figure 7:
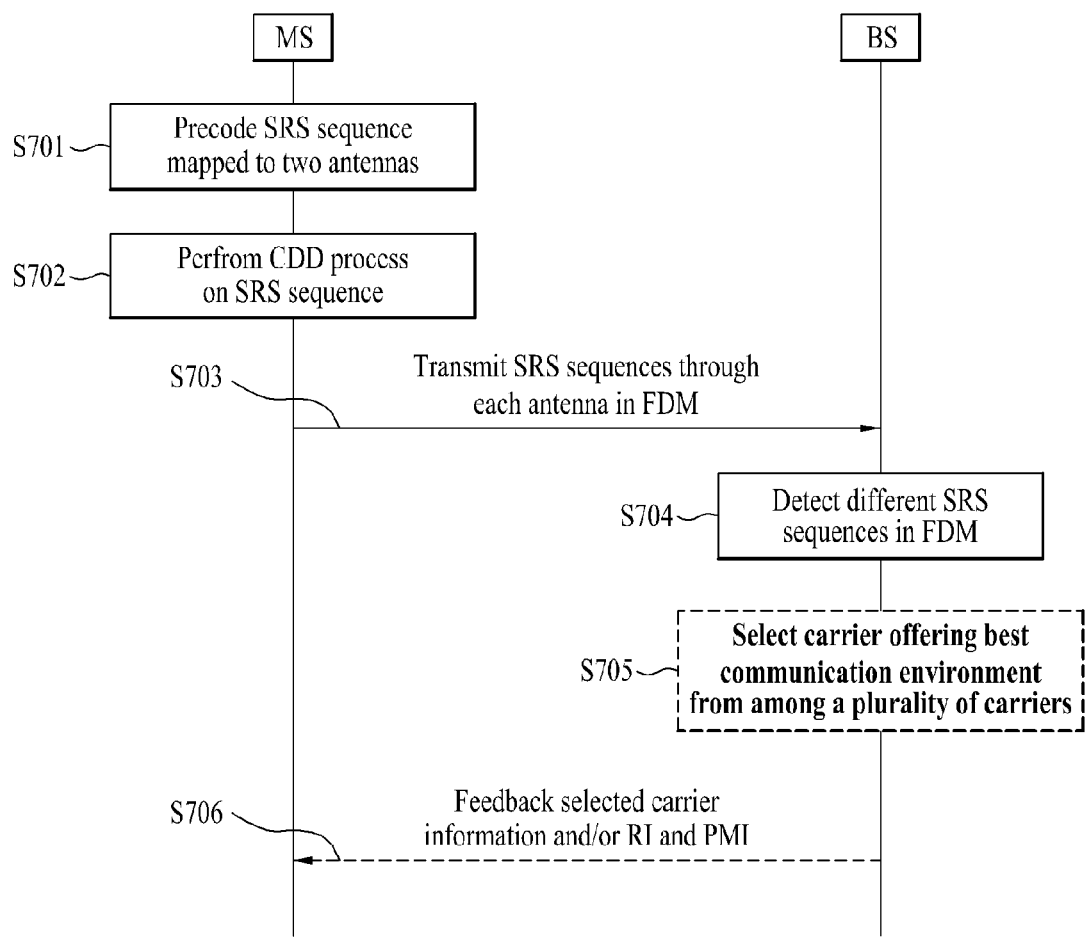
FIG. 7 is a diagram illustrating a signal flow for transmitting an SRS sequence through a plurality of transmission antennas by precoding the SRS sequence according to a further embodiment of the present invention.

FIG. 7 is a diagram illustrating a signal flow for a method for transmitting an SRS sequence through a plurality of antennas by precoding the SRS sequence according to an embodiment of the present invention.

In the embodiment of the present invention, the same SRS sequence and the same SRS bandwidth may be allocated to a

TABLE 8

| Cases | Primary | Non-primary |
|---|---|---|
| Channel dependent scheduling | Frequent Subband SRS | Occasional wideband SRS |
| Non channel dependent scheduling | Frequent Wideband SRS | Occasional wideband SRS |
| Clustered scheduling, each antenna transmits signal on different BW [maybe with MU-MIMO] | Each antenna may transmit SRS on different BW, subband SRS | Possibly frequent subband SRS or occasional wideband SRS |
| Clustered scheduling, some antennas transmit signal on same BW [maybe with MU-MIMO] | Frequent subband SRS over discontinuous BW? Or a little infrequent subband cluster SRS? | Possibly frequent subband SRS or occasional wideband SRS |

The above-described multi-antenna SRS transmission methods are applicable to a UE with four or more antennas as well as a UE with two antennas.

Figure 5:
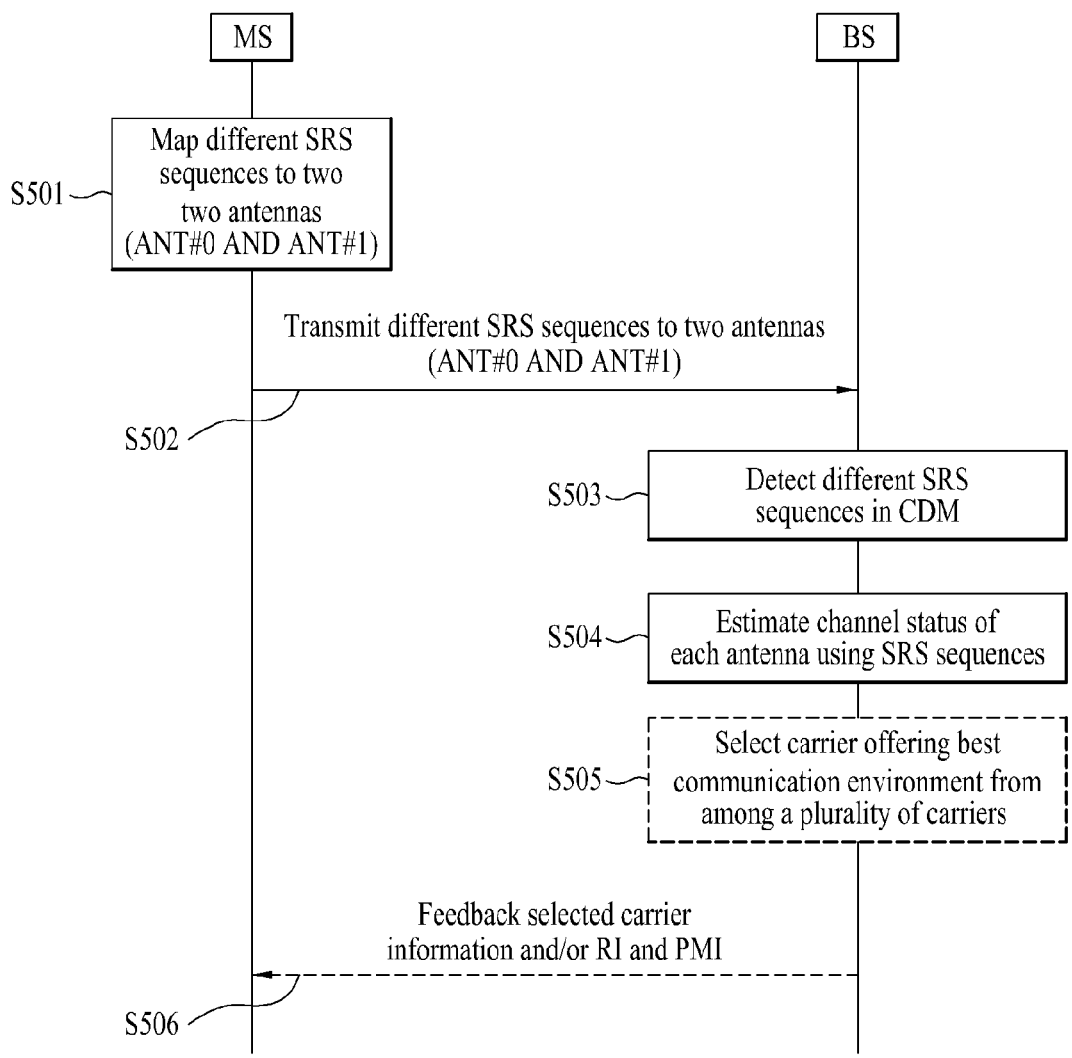
FIG. 5 is a diagram illustrating a signal flow for transmitting SRS sequences through a plurality of transmission antennas by mapping different SRS sequences to the transmission antennas according to an embodiment of the present invention.

FIG. 5 is a diagram illustrating a signal flow for a method for mapping different SRS sequences to different transmission antennas and transmitting the SRS sequences through the transmission antennas according to an embodiment of the present invention.

In accordance with the embodiment of the present invention, a UE with a plurality of antennas, for example, two antennas may map different SRS sequences to the antennas (S501). The different SRS sequences may be mutually orthogonal. The UE may transmit these SRS sequences through the two antennas Ant#0 and Ant#1 (S502). In this embodiment of the present invention, steps for implementing other features of the present invention or the features may further be performed. One of the SRS sequences may be created by cyclically shifting another SRS sequence. Or the SRS sequences may be generated out of different base sequences. The different base sequences may be selected from different sets of base sequences.

A receiver (e.g. a BS), which has received the SRS sequences from the UE, may detect the different SRS sequences in CDM (S503). The BS may estimate the channel state of each antenna using the SRS sequences (S504).

Figure 6:
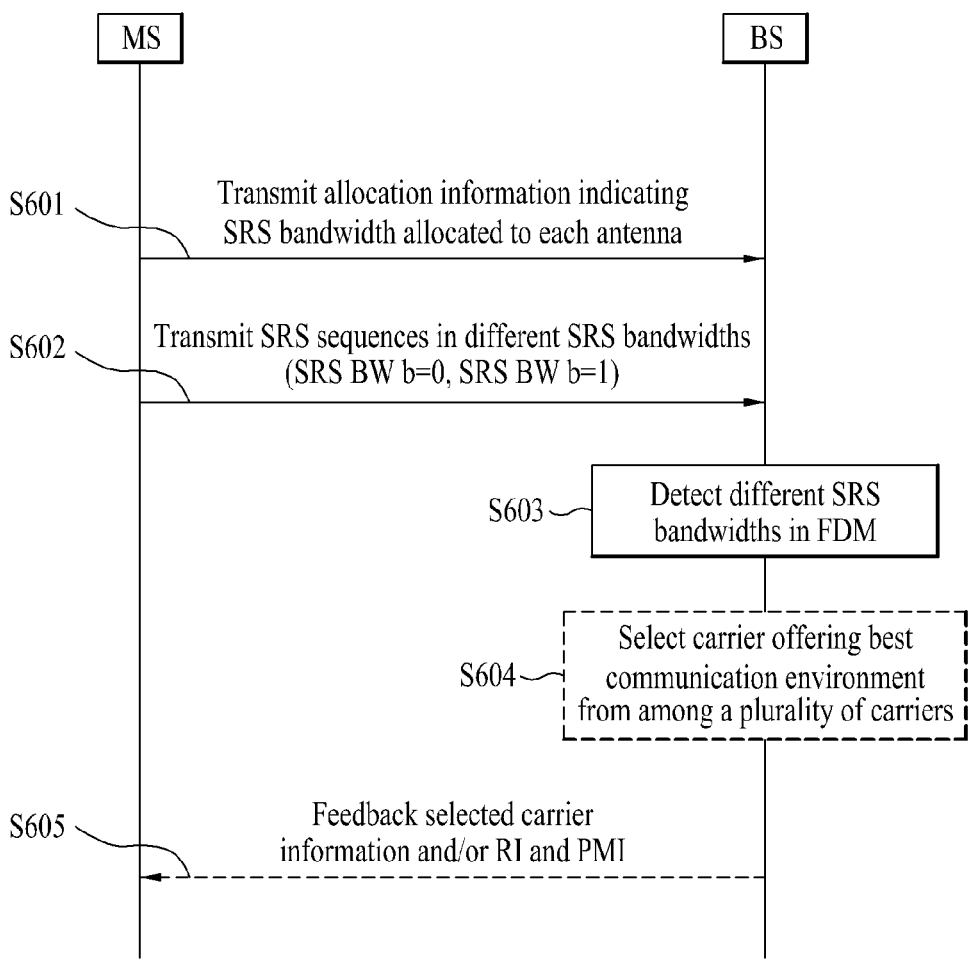
FIG. 6 is a diagram illustrating a signal flow for transmitting SRS sequences through a plurality of transmission antennas by mapping different SRS bandwidths to the transmission antennas according to another embodiment of the present invention.

FIG. 6 is a diagram illustrating a signal flow for allocating different SRS bandwidths to different transmission antennas plurality of antennas at a UE. In this embodiment, the SRS sequence may be precoded (S701). Further, the precoded SRS sequence may be processed through cyclic delay diversity (S702). The UE may transmit the resulting SRS sequences in FDM through the antennas (S703).

Upon receipt of the SRS sequences from the UE, the BS may detect the SRS sequences (S704).

In the above-described embodiments, if the UE and the BS are in a multi-carrier system, the BS may further select a carrier that offers the best communication environment for the UE (S505, S603 and S705). In addition, the BS may further transmit carrier feedback information to enable the UE to use the selected carrier and/or an optimal rank indicator and precoding matrix index required for uplink multiple antennas (S506, S604 and S706).

The methods for transmitting an SRS through two antennas have been described so far. Now a description will be given of methods for simultaneously transmitting an SRS through four antennas. The simultaneous 2-antenna transmission techniques are applicable to four antennas using four power amplifiers. With later-described simultaneous 4-antenna SRS transmission methods, channel information about a total SRS bandwidth may be acquired in a short time.

The simultaneous 4-antenna SRS transmission methods may be largely divided into non-precoded SRS transmission and precoded SRS transmission. The former will first be described below.

According to the present invention, non-precoded SRS transmission schemes may further be divided into a CDMA-based scheme, an FDMA-based scheme, and a hybrid scheme of TDMA/FDMA/CDMA.

Figure 8:
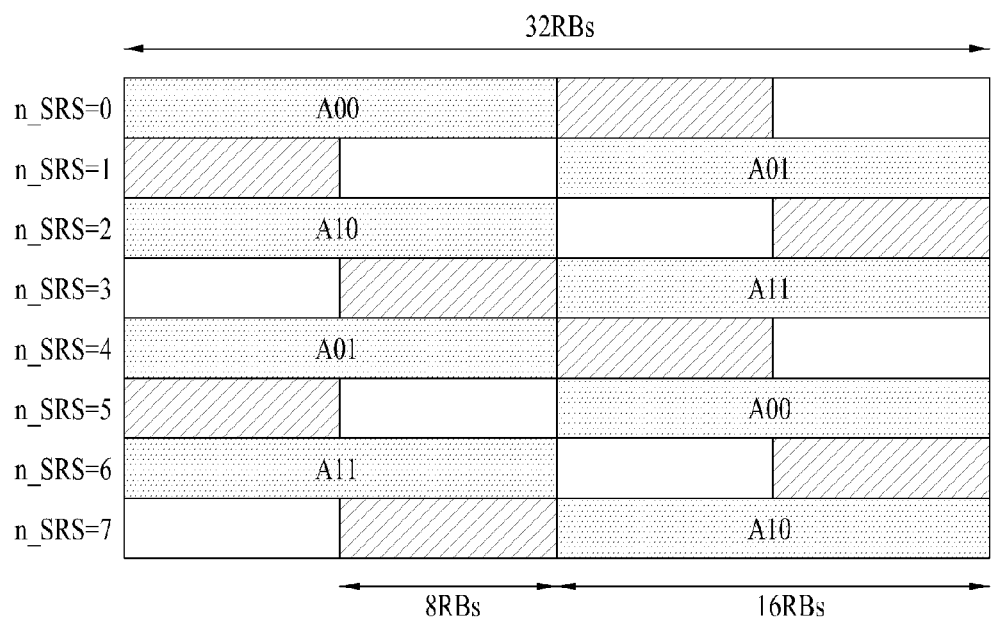
FIG. 8 illustrates 4-antenna SRS transmission using a single power amplifier according to an embodiment of the present invention.

If a single power amplifier is shared among four antennas, each of the antennas can transmit an SRS in a given SRS symbol, like 2-antenna SRS transmission. Like a UE with two antennas, a UE with four antennas may transmit an SRS through one after another antenna, using one SRS bandwidth and base sequence. For example, if antenna 0 to antenna 3 represent A00, A10, A01 and A11, respectively, an SRS transmission may be performed as illustrated in FIG. 8.

In a CDM-based 4-antenna SRS transmission scheme, if the same UE-specific bandwidth and different sequences are allocated to four antennas at a UE, the UE may transmit SRSs in CDM. That is, as the four antennas transmit an SRS using different sequences in the same UE-specific bandwidth, channel information about the four antennas in the SRS bandwidth can be acquired at the same time. According to this scheme, channel information about the four antennas in the total SRS bandwidth can be acquired just in a quarter of an SRS transmission period required for acquisition of channel information of a total SRS bandwidth in a conventional frequency hopping pattern.

In an FDM-based 4-antenna SRS transmission scheme, if each antenna has a different UE-specific bandwidth at a UE with four antennas, an SRS is transmitted in the UE-specific SRS bandwidths allocated to the four antennas through the four antennas. With this scheme, channel information about the plurality of antennas can be acquired using the SRS in a shorter time. In this case, the four antennas may use the same or different sequences. In addition, a total bandwidth allocated to the four antennas may be divided into four bandwidths, and a sequence may be generated for each divided ¼ bandwidth and transmitted in the divided ¼ bandwidth. Therefore, a frequency hopping pattern designed for a 20-MHz band in the legacy LTE system may be extended to 80 MHz.

It is also possible to group antennas by twos, generate a sequence for a half of the bandwidth allocated to a pair of antennas, and transmit the sequence in the half bandwidth. For instance, if antenna port 0 is paired with antenna port 1, a sequence is generated for each half of 16 RBs allocated to these two antenna ports, that is, 8 RBs and then transmitted in an area corresponding to the bandwidth of 8 RBs. Likewise, antenna port 2 is paired with antenna port 3. A sequence is generated for each half of 8 RBs allocated to these two antenna ports, that is, 4 RBs and then transmitted in an area corresponding to the bandwidth of 4RBs.

In a 4-antenna SRS transmission scheme based on TDM/FDM/CDM in combination, when a UE with four antennas can transmit an SRS simultaneously through the four antennas using four power amplifiers, the SRS transmission can be efficient using TDM, CDM and FDM in combination. These multiplexing techniques may be applied in combination by pairing antennas that transmit an SRS. For this purpose, the four antennas may be grouped by twos, or three out of the four antennas form one group and the other one antenna forms another group. Especially in TDM, an SRS can be transmitted simultaneously using as many power amplifiers as the number of antennas within a group. For example, if two antennas are paired and different SRS symbols are transmitted in TDM through the pair of antennas, two power amplifiers are required. A method for pairing two antennas ports according to an embodiment of the present invention will be described below.

Figure 9:
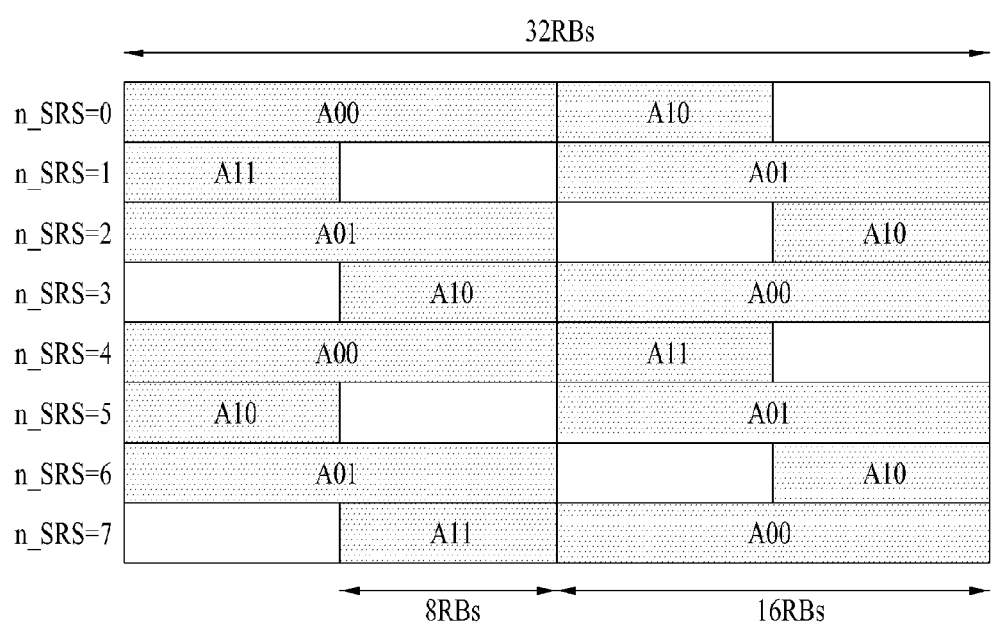
FIG. 9 illustrates 4-antenna SRS transmission in Frequency Division Multiplexing (FDM) and Time Division Multiplexing (TDM) according to an embodiment of the present invention.

FIG. 9 illustrates 4-antenna SRS transmission in FDM and TDM according to an embodiment of the present invention.

According to the embodiment of the present invention, different SRS bandwidths are allocated to a pair of two antennas and SRS sequences are FDM-multiplexed for the two antennas. SRS sequences are TDM-multiplexed between antenna pairs. In this case, SRS transmission is possible by means of two power amplifiers. That is, at a first SRS transmission time, antenna port 0 and antenna port 1 simultaneously transmit an SRS in different SRS bandwidths, while antenna port 2 and antenna port 3 do not transmit an SRS. Then antenna port 2 and antenna port 3 transmit an SRS simultaneously in FDM in the SRS bandwidths that were allocated to antenna port 0 and antenna port 1. For example, if antenna port 0 to antenna port 3 of a UE represent A00, A10, A01 and A11, respectively, an SRS may be transmitted in the manner illustrated in FIG. 9.

In another embodiment of the present invention, the same SRS bandwidth and different sequences are allocated to a pair of antennas and SRS sequences are CDM-multiplexed in the SRS bandwidth of the two antennas. SRS sequences are TDM-multiplexed between antenna pairs. In this case, SRS transmission is possible by means of two power amplifiers. At a first SRS transmission time, an SRS is transmitted simultaneously through antenna port 0 and antenna 1 using different sequences in the same SRS bandwidth, while it is not transmitted through antenna port 2 and antenna port 3. At a second SRS transmission time, an SRS is transmitted simultaneously through antenna port 2 and antenna 3 using the sequences and SRS bandwidth allocated to antenna port 0 and antenna port 1. If four antennas simultaneously transmit SRSs in CDM, four sequences are needed. However, if four antennas simultaneously transmit SRSs in CDM and TDM, two sequences are sufficient.

In a further embodiment of the present invention, the same SRS bandwidth and different sequences are allocated to a pair of antennas and SRS sequences are CDM-multiplexed in the SRS bandwidth of the two antennas. SRS sequences are FDM-multiplexed between antenna pairs. Antenna port 0 and antenna port 1 simultaneously transmit an SRS using different sequences in the same SRS bandwidth, while antenna port 2 and antenna port 3 transmit an SRS simultaneously in an SRS bandwidth different from the SRS bandwidth allocated to antenna port 0 and antenna port 1, in FDM.

Now a description will be given of a precoded SRS transmission scheme according to the present invention.

The afore-described simultaneous SRS transmission methods based on a combining scheme are applicable to four antennas as well as two antennas. That is, a precoded SRS can be transmitted by applying the combining scheme to four antenna ports.

Or antenna ports are paired, precoding is applied to each pair of antenna ports, and a precoded SRS is transmitted simultaneously through the pair of antenna ports. That is, when antenna port 0 is paired with antenna port 1 and antenna port 2 is paired with antenna port 3, precoding is applied to each pair of antenna ports, and each pair of antenna ports may be regarded as a single antenna. A UE with four antennas may be considered to be a UE with two 2-precoded antennas. In this manner, 4-antenna transmission can be carried out in TDM as well as CDM and FDM described in relation to simultaneous 2-antenna SRS transmission, using precoded pairs. On the assumption that a UE transmits SRSs in TDM through two 2-precoded antennas, two power amplifiers may be used. In addition, CDD as well as precoding may be applied together or separately.

Figure 10:
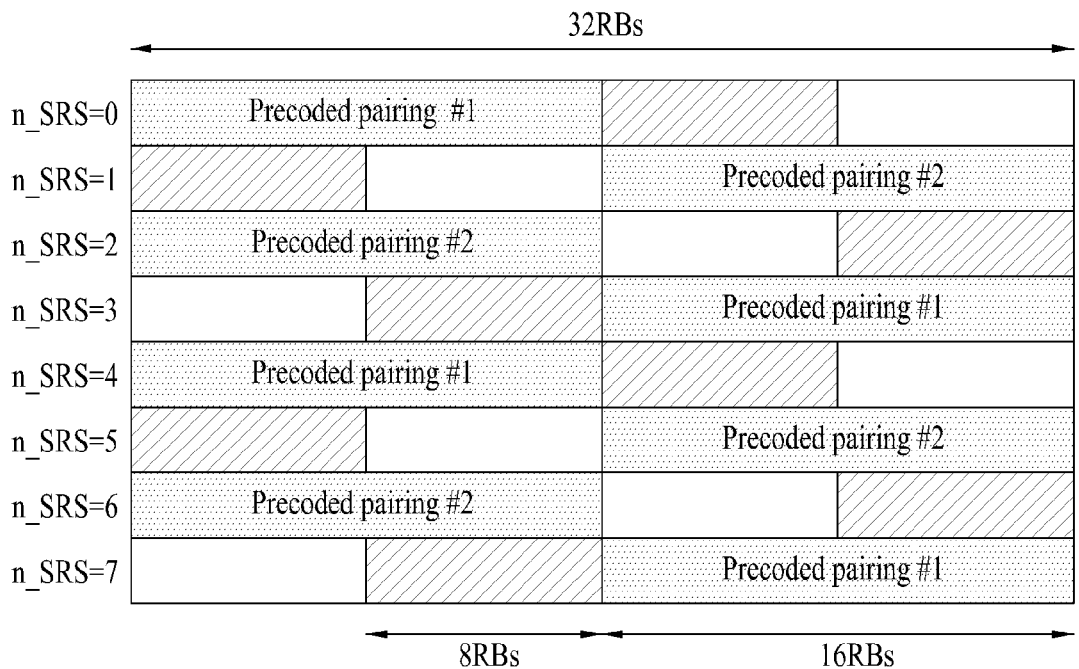
FIG. 10 illustrates 4-antenna SRS transmission in TDM through precoded antenna pairs according to an embodiment of the present invention.

FIG. 10 illustrates 4-antenna SRS transmission in TDM through precoded antenna pairs according to an embodiment of the present invention.

Referring to FIG. 10, an SRS is transmitted through a first precoded pair (antenna port 0 and antenna port 1) at a first SRS transmission time and through a second precoded pair (antenna port 2 and antenna port 3) at a second SRS transmission time.

Figure 11:
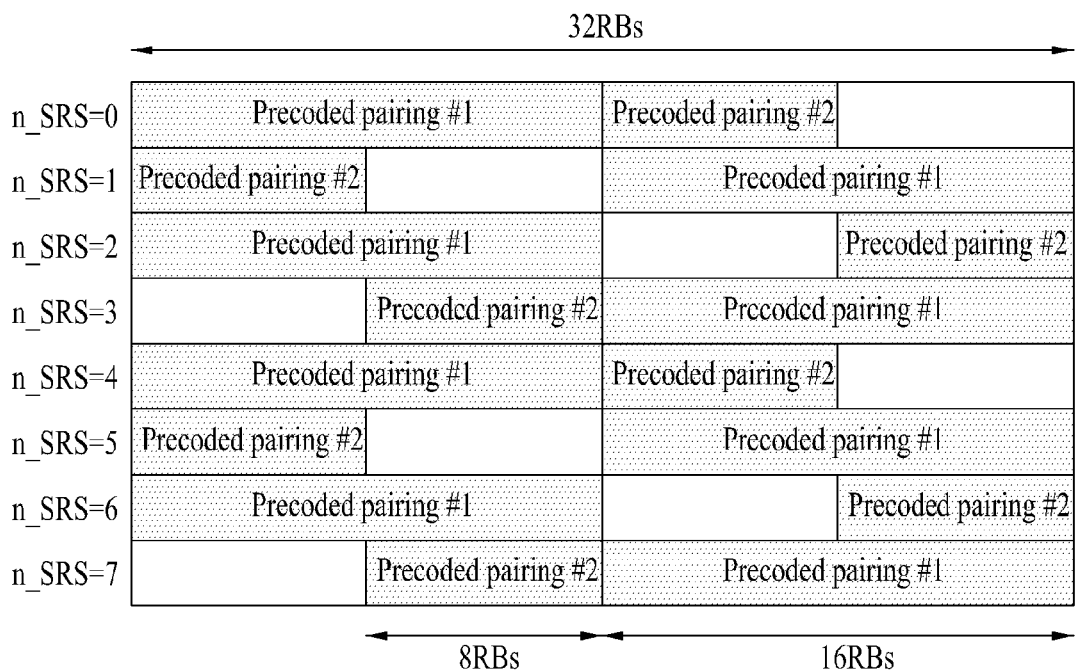
FIG. 11 illustrates 4-antenna sounding reference signal transmission in FDM through precoded antenna pairs according to an embodiment of the present invention.

FIG. 11 illustrates 4-antenna sounding reference signal transmission in FDM through precoded antenna pairs according to an embodiment of the present invention.

Referring to FIG. 11, different SRS bandwidths are allocated to each pair of precoded antennas. Each precoded antenna pair transmits a precoded SRS in an allocated SRS bandwidth. Given a first precoded pair (antenna port 0 and antenna port 1) and a second precoded pair (antenna port 2 and antenna port 3), an SRS is transmitted through time-frequency scheduling as illustrated in FIG. 10.

The embodiments of the present invention described above are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a description has been mainly made of a data transmission and reception relationship between a BS and a UE. A specific operation described as being performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with a fixed station, a Node B, an eNode B (eNB), an access point, etc. The term 'terminal' may be replaced with a UE, a Mobile Station (MS), a Mobile Subscriber Station (MSS), etc.

The embodiments of the present invention may be achieved by various means, for example, hardware, firmware, software, or a combination thereof. In a hardware configuration, an embodiment of the present invention may be achieved by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. that performs the above-described functions or operations. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

Industrial Applicability

The present invention is applicable to a mobile wireless communication system using an SRS

The invention claimed is:

1. A method for transmitting a Sounding Reference Signal (SRS) to a base station at a User Equipment (UE) using a plurality of antennas on a plurality of carriers in a mobile wireless communication system, the method comprising:
   receiving a cyclic shift value for a first antenna via a higher layer;
   configuring a cyclic shift value for a second antenna by using the cyclic shift value for the first antenna;
   generating a first SRS sequence using the cyclic shift value for the first antenna and a second SRS sequence using the cyclic shift value for the second antenna, wherein the first SRS sequence and the second SRS sequence are generated from a same base sequence;
   transmitting, at a first transmission timing, the first SRS sequence through the first antenna on a first carrier and the second SRS sequence through the second antenna on a second carrier; and
   transmitting, at a second transmission timing, the first SRS sequence through the first antenna on the second carrier and the second SRS sequence through the second antenna on the first carrier,
   wherein the first SRS sequence and the second SRS sequence have a same hopping pattern.

2. The method according to claim 1, wherein the same SRS bandwidth is allocated to the first antenna and the second antenna.

3. The method according to claim 1, wherein different SRS bandwidths are allocated to the first antenna and the second antenna.

4. The method according to claim 3, wherein the SRS bandwidth allocated to the first antenna is adjacent to the SRS bandwidth allocated to the second antenna.

5. A method for receiving a Sounding Reference Signal (SRS) from a User Equipment (UE) using a plurality of antennas via a plurality of carriers at a base station in a mobile wireless communication system, the method comprising:
   transmitting a cyclic shift value for a first antenna to the UE;
   receiving, at a first transmission timing, a first SRS sequence through a first antenna on a first carrier and a second SRS sequence through a second antenna on a second carrier from the UE; and
   receiving, at a second transmission timing, the first SRS sequence through the first antenna on the second carrier and the second SRS sequence through the second antenna on the first carrier from the UE,
   wherein the first SRS sequence and the second SRS sequence are generated from a same base sequence,
   wherein the first SRS sequence is generated using the cyclic shift value for the first antenna and the second SRS sequence are generated using a cyclic shift value for a second antenna,
   wherein the cyclic shift value for the second antenna is determined based on the cyclic shift value for the first antenna, wherein the first SRS sequence and the second SRS sequence have a same hopping pattern.

6. The method according to claim 5, wherein the same SRS bandwidth is allocated to the first antenna and the second antenna.

7. The method according to claim 5, wherein different SRS bandwidths are allocated to the first antenna and the second antenna.

8. The method according to claim 7, wherein the SRS bandwidth allocated to the first antenna is adjacent to the SRS bandwidth allocated to the second antenna.

9. The method according to claim 1, wherein the base station obtains channel status information for each of the first carrier and the second carrier using the first and second SRS sequences and allocates at least one carrier to the UE based on the channel status information for each of the first carrier and the second carrier.

10. The method according to claim 5, further comprising:
obtaining channel status information for each of the first carrier and the second carrier using the first and second SRS sequences; and
allocating the at least one carrier to the UE based on the channel status information for each of the first carrier and the second carrier.

* * * * *